Nov. 22, 1932.　　　　E. BOCCHINO　　　　1,888,616
ROASTING PAN ATTACHMENT
Filed Dec. 10, 1930　　2 Sheets-Sheet 1

INVENTOR
Ernest Bocchino
BY
Warren E. Willis,
ATTORNEY

Nov. 22, 1932.  E. BOCCHINO  1,888,616
ROASTING PAN ATTACHMENT
Filed Dec. 10, 1930   2 Sheets-Sheet 2
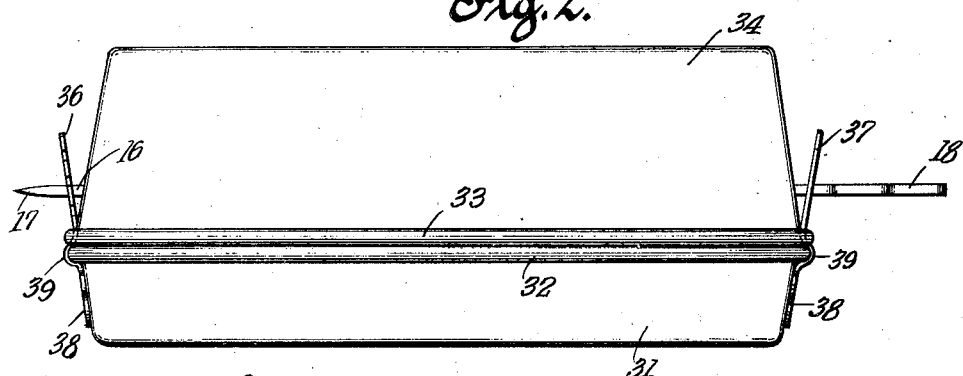
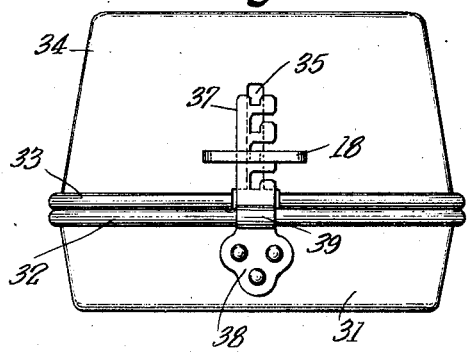 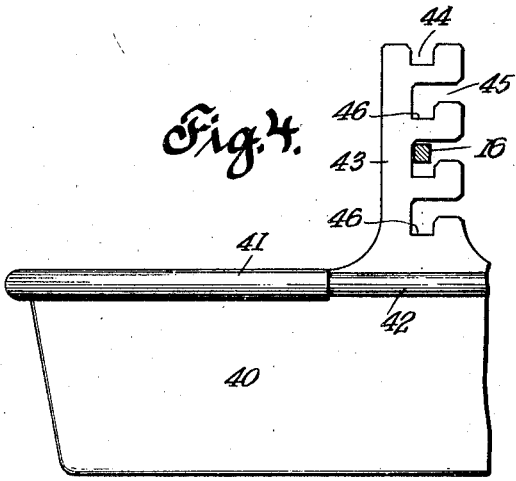
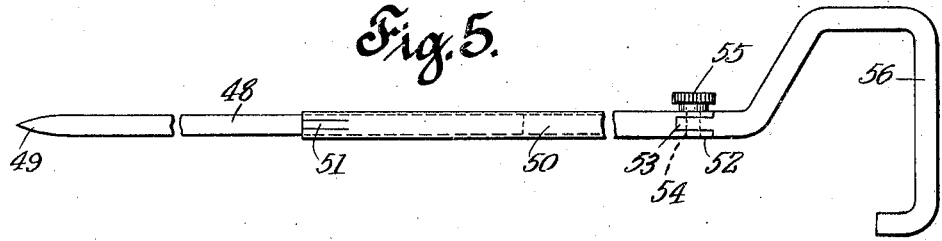
INVENTOR
Ernest Bocchino
BY
Warren E. Willis.
ATTORNEY Patented Nov. 22, 1932

1,888,616

UNITED STATES PATENT OFFICE

ERNEST BOCCHINO, OF NEWARK, NEW JERSEY

ROASTING PAN ATTACHMENT

Application filed December 10, 1930. Serial No. 501,178.

This invention relates to roasting pans and attachments, the same being an improvement over my former Patent Number 1,741,400, issued Dec. 31, 1929.

In the roasting of meats, such as cuts of beef, ham and poultry it is not only desirable to use a spit passing through the article to be roasted, but also to retain the roast at a variable height relative to the bottom of the pan, hence it is one of the objects of the present invention to provide a stepped support for the spit which permits of adjustment as well as rotation of the roast.

A further feature of the invention is in the provision of a cover for the pan by which the flavor and emanations of the roast are maintained and prevented from being dissipated in the atmosphere.

Another aim is to produce a length adjustable spit which may be provided with a hinged handle, thereby requiring but a limited space within an oven.

These and other advantageous aims and objects are attained by the novel construction and combination of parts hereinafter described and shown in the accompanying drawings, constituting an essential part of this disclosure, and in which:—

Figure 2 is a side elevational view of a modified type of pan, its spit carrying supports and a cover over the roast.

Figure 3 is an end view of the same.

Figure 4 is a partial end view of a pan having a modified type of spit support.

Figure 5 is a side elevational view of a telescopically adjustable spit provided with a detachable or hinged handle.

Figure 1:
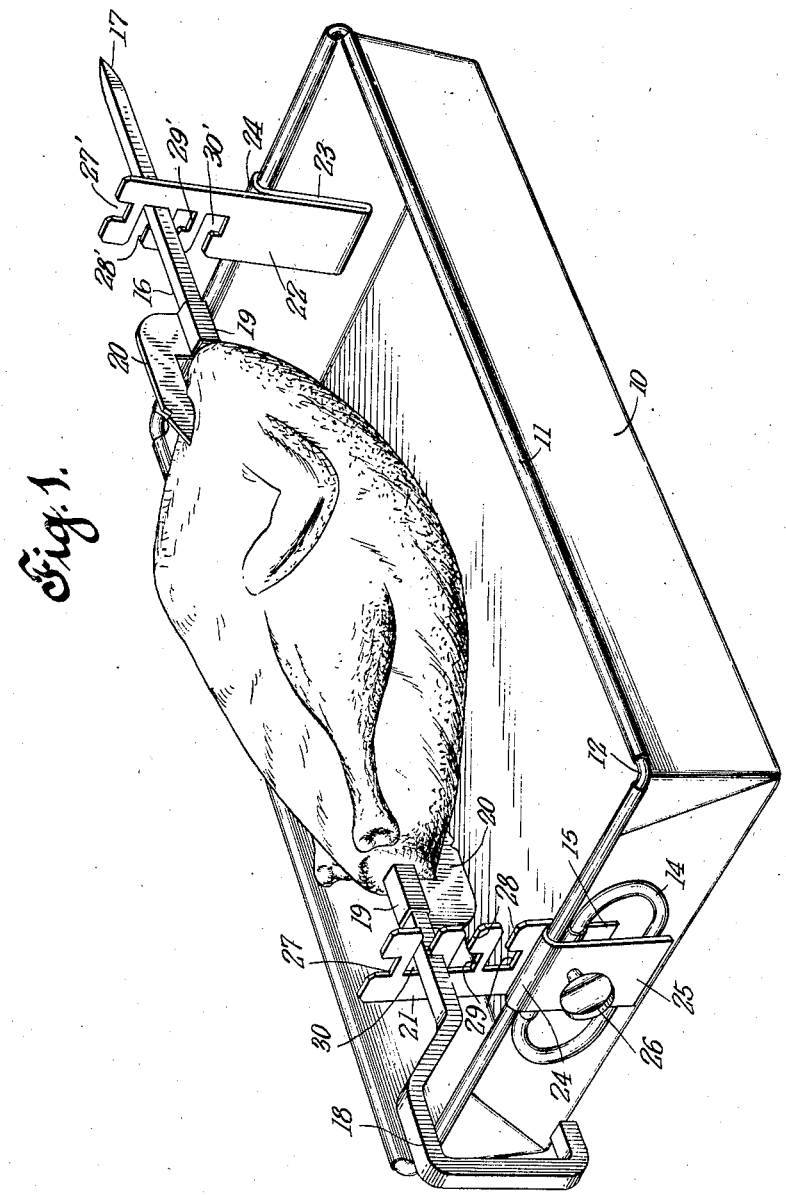
Figure 1 is a perspective view showing a conventional type of roasting pan and its spit as in applied position.

Referring to the drawings in greater detail, the numeral 10 designates in general a common type of roasting pan provided with a beaded edge 11 containing a re-enforcing wire 12.

The pan may be furnished with handles 14 hingedly secured to its ends by clips 15, or may be plain, as indicated in Figures 2, 3 and 4.

The spit 16 is formed of a rod of square cross section, one end being pointed, as at 17, and the other bent to produce a handle 18.

Movable on the rod are enclosing slides 19 from which project opposed offset impaling hooks 20, serrated on their edges and spear pointed to be forced into the roast to engage firmly therein so that upon rotating the spit, the roast will turn with it.

The supports for the spit consists of a pair of upright plates 21—22, their lower portions extending down inside the ends of the pan and then folded tight upon themselves, as at 23, to extend over the beads 11, as at 24, their continuing outer elements 25 reaching over the handles 14 and being provided with thumb screws 26.

The plate 21 has a notch 27 in its upper edge to receive the spit rod 16 and therebelow are a series of lateral slots 28 leading to enlarged rectangular openings 29, the slots 28 and openings 29 being closely receptive of the rod while at their juncture is sufficient space to turn the rod, as at 30.

The opposite plate 22 is provided with a similar notch 27' and corresponding slots 28' leadng to openings 29', all of which are slightly wider to allow the spit rod to turn freely therein.

In Figures 2 and 3 the pan 31 is provided with a similar wired bead 32 on which may be seated a corresponding bead 33 formed on a cover 34, which may be a reversed pan and is provided with slots 35 in each end to permit passage of the spit rod 16.

The supports 36—37 in this case consist of sheet metal strips having base members 38 riveted or otherwise secured directly on the outside of the ends of the pan, and are bent to clear the bead 20, as at 39, and then extended upwardly, in opposed relation in the manner previously described, being provided with similar notches, slots and openings.

Obviously all the steam, aroma and odor of the cooking roast are maintained between the pan and its cover, rendering the food more palatable and juicy, vapors being unable to escape to any material extent.

Another modification, shown in Figure 4, illustrates a pan 40 having a bead 41 enclosing a wire 42, and in this case the material forming the end of the pan is extended upwardly constituting a support 43 provided with a notch 44 at the top and a series of lateral slots 45 leading to rectangular openings 46 in any one of which a spit rod may be entered and held in the manner before described.

In place of an integral spit rod a rectangular rod 48, provided with a sharply pointed end 49, may be telescopically engaged in a tube 50, split as at 51 at the entry end and provided at the opposite, outer end with a fork 52 between the parts of which may be entered a tenon 53 held in place by a pivot 54 provided with a knurled head 55.

The pivot may be permanently applied, in which case it acts as a hinge pin, or it may be removable, thereby permitting disassociation of a handle 56 on which the tenon is formed.

Thus the handle may be downturned alongside the end of the pan, or removed at will.

Although the improvements have been described with considerable detail and with respect to certain particular forms of the invention, it is not desired to be limited to such details since many changes and modifications may well be made without departing from the spirit and scope of my invention in its broadest aspect.

Having thus described the invention, what is claimed as new and desired to secure by Letters Patent, is:—

1. The combination with a roasting pan having a beaded edge, of a cover adapted to rest on said edge, said cover having slots in its end walls, a spit having means to adjustably engage the ends of an object through which the spit is passed, and stepped supports carried by the ends of said pan to engage said spit at different distances from the pan bottom.

2. The combination with a roasting pan having a beaded edge, of a cover adapted to rest on said edge, a spit on which an article to be roasted may be impaled, means adjustable on said spit to engage the opposite ends of the article, supports on the ends of said pan having means to receive said spit at different levels, said spit passing through the slots of said cover, and a handle removably engaged at one end of said spit.

3. The combination with a roasting pan having a beaded edge, of a cover adapted to rest on said edge, a spit on which an article to be roasted may be impaled, means for adjusting the length of said spit, supports fixed on the ends of said pan having laterally enterable openings to receive said spit at variable levels, and slots in the end walls of said cover to engage over said spit.

4. The combination with a roasting pan having a beaded edge, of a cover adapted to rest on said edge, a spit on which an article to be roasted may me impaled, means adjustable on said spit to engage the opposite ends of the article, laterally notched supports integral with the ends of said pan to retain said spit at a variable height, the notches in said supports being adapted to prevent turning said spit when seated therein, said notches having enlarged upper portions in which said spit may be rotated, and a handle on said spit foldable against the end of said pan.

5. The combination with a shallow rectangular roasting pan having oblique walls and a beaded edge, of a rectangular spit rod pointed at one end and having an integral handle at the other, upright supports detachably engaged on the ends of said pan, said supports having a series of spaced lateral openings to receive said rod at different heights, the openings in one support permitting rotation of said rod and the openings in the other support normally preventing rotation of the rod when disposed therein, all of the openings having down-reaching rectangular seats to engage said rod.

In testimony whereof I affix my signature.

ERNEST BOCCHINO.